(12) United States Patent
Kepner et al.

(10) Patent No.: US 10,134,194 B2
(45) Date of Patent: Nov. 20, 2018

(54) MARKING UP SCENES USING A WEARABLE AUGMENTED REALITY DEVICE

(71) Applicant: EVERNOTE CORPORATION, Redwood City, CA (US)

(72) Inventors: Braeden Kepner, Woodside, CA (US); Brian Griffey, Austin, TX (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 15/428,098

(22) Filed: Feb. 8, 2017

(65) Prior Publication Data
US 2017/0337738 A1   Nov. 23, 2017

Related U.S. Application Data

(63) Continuation of application No. 14/289,716, filed on May 29, 2014, now abandoned.

(60) Provisional application No. 61/847,265, filed on Jul. 17, 2013.

(51) Int. Cl.
G09G 5/00 (2006.01)
G06T 19/00 (2011.01)
G06T 11/60 (2006.01)

(52) U.S. Cl.
CPC ............ G06T 19/006 (2013.01); G06T 11/60 (2013.01); G06T 2219/004 (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 5,920,685 A | * | 7/1999 | Romano | H04N 1/3871 345/629 |
| 7,340,503 B2 | * | 3/2008 | Washburn | H04L 51/04 709/203 |
| 8,315,801 B2 | * | 11/2012 | Takagi | G09B 29/102 340/995.19 |

(Continued)

OTHER PUBLICATIONS

Langlotz et al., Sketching up the world: in situ authoring for mobile Augmented Reality, Personal and Ubiquitous Computing, vol. 16, Issue 6, Aug. 2012, pp. 632-630.*

(Continued)

Primary Examiner — Charles Tseng
(74) Attorney, Agent, or Firm — Morgan, Lewis & Bockius LLP

(57) ABSTRACT

Marking up an image corresponding to a scene viewed by a user includes receiving the image at a mobile device from a device other than the mobile device, creating a marked up image by annotating the image using markup software running on the mobile device, and saving the marked up image. Marking up an image corresponding to a scene viewed by a user may also include capturing the image using a wearable augmented reality device and transferring the image from the wearable augmented reality device to the mobile device. The wearable augmented reality device may be smart glasses. Marking up an image corresponding to a scene viewed by a user may also include supplementing the marked up image with a portion of a map indicating where the image was captured. The marked up image may be a still image or a video image.

17 Claims, 6 Drawing Sheets

(56) References Cited

U.S. PATENT DOCUMENTS

| | | | | |
|---|---|---|---|---|
| 8,990,682 B1* | 3/2015 | Wong | G02B 27/017 | 715/254 |
| 2004/0249899 A1* | 12/2004 | Shiigi | G06Q 10/107 | 709/206 |
| 2008/0062133 A1* | 3/2008 | Wolf | G06F 3/0489 | 345/168 |
| 2010/0063961 A1* | 3/2010 | Guiheneuf | G06F 17/30265 | 707/622 |
| 2011/0115816 A1* | 5/2011 | Brackney | G06Q 10/06 | 345/629 |
| 2012/0180111 A1* | 7/2012 | Velasco | G06F 21/62 | 726/4 |
| 2013/0021374 A1* | 1/2013 | Miao | G06F 3/011 | 345/633 |
| 2013/0187949 A1* | 7/2013 | Meadow | G06T 17/05 | 345/632 |
| 2014/0267400 A1* | 9/2014 | Mabbutt | G06T 19/006 | 345/633 |

OTHER PUBLICATIONS

Kepner, Office Action, U.S. Appl. No. 14/289,716, 34 pgs., dated Apr. 26, 2016.

Kepner, Final Office Action, U.S. Appl. No. 14/289,716, 29 pgs., dated Aug. 8, 2016.

* cited by examiner

MARKING UP SCENES USING A WEARABLE AUGMENTED REALITY DEVICE

CROSS-REFERENCE TO RELATED APPLICATIONS

This application is a continuation of application Ser. No. 14/289,716, filed May 29, 2014, and entitled "MARKING UP SCENES USING A WEARABLE AUGMENTED REALITY DEVICE," which claims priority to U.S. Prov. App. No. 61/847,265, filed Jul. 17, 2013, and entitled "MARKING UP SCENES USING SMART GLASSES AND SMARTPHONE," both of which are incorporated herein by reference.

TECHNICAL FIELD

This application is directed to the field of processing, transmission and presentation of information, and more particularly to the field of marking up, annotating and transmitting image data captured by users wearing smart glasses with a photo or video camera.

BACKGROUND OF THE INVENTION

Wearable computers, such as head-mounted cameras and displays, smart watches, smart clothes, wearable medical devices, are coming to market at an accelerated pace. Many analysts are predicting an explosive growth of smart wearable devices over the next few years. In 2013, different categories of wearable devices have gained market momentum and, according to some forecasts, annual shipments of wearable computing devices will come close to 20 million units in 2014 and quickly proliferate to over 111 million units by 2016. Other studies, focusing on specific market segments, such as smart glasses (also called VR glasses, augmented reality headsets, head-mounted displays with cameras, etc.) provide similar forecasts. Thus, a recent report estimates that a worldwide use of augmented reality devices may reach 1% of the total world population by 2016, which amounts to more than 70 M units for that category alone.

Recent developments, previews and the start of sales of the Google Glass augmented reality device denote a step in the proliferation of augmented reality devices. Google Glass and other models of smart glasses may interoperate with third party software via published APIs. Many experts agree that the success of wearable computers will be determined by a breadth, usability and convenience of an ecosystem of applications and cloud services built for these devices and interconnecting them.

Within a few months since the release of developer materials and units of Google Glass, hundreds of software applications have been created, including information services indicating how to download data to smart glasses for viewing, as well as how to upload data captured by smart glasses to online services and to other devices, social networking applications, games, remote control software, etc. Tracking and capturing fragments or full views of surrounding scenes is a useful aspect of user experiences with smart glasses. Google Glass offers voice and touch controlled photographing and video recording of scenes, which enhances discovery, learning, research, coordination and other user capabilities. Photos and video clips of real life scenes may be transferred over different types of wireless connections to online services, and eventually to peer devices owned by the user, and may be stored in personal and shared content management systems, such as the Evernote Service developed by Evernote Corporation of Redwood City, Calif.

However, a sheer capturing capability of smart glasses and other wearable augmented reality devices may not be sufficient for their productive use. In many practical scenarios, portions of captured scenes could benefit from basic editing, user annotations or markup for better memorizing, for creating associations with other scenes or adding necessary information. Markup and annotation capabilities may also be useful for soliciting third party advice by the device owner, such as identification of scene objects, getting additional information about them, driving or walking directions, instructions on object manipulation, etc. Therefore, markup and basic image processing capabilities, such as cropping of a portion of a scene, may be quite helpful for the successful use of smart glasses. Numerous markup software applications are available for a variety of desktop and mobile platforms, such as Skitch by Evernote. However, a straightforward use of the available markup software on smart glasses may be problematic due to rudimentary user interface capabilities of augmented reality devices, which are designed for basic interactions with users.

Accordingly, it is desirable to develop a markup system and process for smart glasses and other wearable augmented reality devices, allowing device owners to view and transfer annotated portions of scenes and enabling third parties to interact with the system and supplement markups with their comments and annotations.

SUMMARY OF THE INVENTION

According to the system described herein, marking up an image corresponding to a scene viewed by a user includes receiving the image at a mobile device from a device other than the mobile device, creating a marked up image by annotating the image using markup software running on the mobile device, and saving the marked up image. Marking up an image corresponding to a scene viewed by a user may also include capturing the image using a wearable augmented reality device and transferring the image from the wearable augmented reality device to the mobile device. The wearable augmented reality device may be smart glasses. Marking up an image corresponding to a scene viewed by a user may also include supplementing the marked up image with a portion of a map indicating where the image was captured. Marking up an image corresponding to a scene viewed by a user may also include superimposing an arrow on the map indicating a direction on the map that points toward the scene. Transferring the image may use wireless technology to directly transfer the image from the wearable augmented reality device to the mobile device. Transferring the image may include the wearable augmented reality device storing the image in a content management system that provides cloud storage and the mobile device retrieving the image from the content management system. Marking up an image corresponding to a scene viewed by a user may also include transferring the marked up image from the mobile device to the wearable augmented reality device. Saving the marked up image may include transferring the marked up image to a content management system that provides cloud storage for the marked up image. The marked up image may be a still image or a video image. The markup software may include arrows, freehand drawing, assisted drawing, shapes, shape connectors, text, captions, semi-transparent highlighters, filling, line width options, color options, shape alignment, and/or cropping tools. The marked up image may include embedded binary data corresponding to mark up annotations superimposed on the image. The user may make the marked up image publically available on the Internet. Marking up an image corresponding to a scene viewed by a user may also include transmitting the marked up image to a recipient. Marking up an image corresponding to a scene viewed by a user may also include, prior to transmitting the marked up image to the recipient, providing at least one question for the recipient, wherein the question is part of a composite mobile message that includes the marked up image. The question may be selected by the user from a list of possible questions provided by the markup software. The recipient may further annotate the marked up image to provide a further annotated marked up image. The recipient may provide the further annotated marked up image back to the user. Marking up an image corresponding to a scene viewed by a user may also include transferring the marked up image from the mobile device to a wearable augmented reality device that was used to capture the image prior to the image being provided to the mobile device. The recipient may make the further annotated marked up image publically available on the Internet.

According further to the system described herein, computer software, provided in a non-transitory computer-readable medium, marks up an image corresponding to a scene viewed by a user. The software includes executable code that receives the image at a mobile device from a device other than the mobile device, executable code that creates a marked up image by annotating the image using markup software running on the mobile device, and executable code that saves the marked up image. The software may also include executable code that captures the image using a wearable augmented reality device and executable code that transfers the image from the wearable augmented reality device to the mobile device. The wearable augmented reality device may be smart glasses. The software may also include executable code that supplements the marked up image with a portion of a map indicating where the image was captured. The software may also include executable code that superimposes an arrow on the map indicating a direction on the map that points toward the scene. Transferring the image may use wireless technology to directly transfer the image from the wearable augmented reality device to the mobile device. Transferring the image may include the wearable augmented reality device storing the image in a content management system that provides cloud storage and the mobile device retrieving the image from the content management system. The software may also include executable code that transfers the marked up image from the mobile device to the wearable augmented reality device. Executable code that saves the marked up image may transfer the marked up image to a content management system that provides cloud storage for the marked up image. The marked up image may be a still image or a video image. The markup software may include arrows, freehand drawing, assisted drawing, shapes, shape connectors, text, captions, semi-transparent highlighters, filling, line width options, color options, shape alignment, and/or cropping tools. The marked up image may include embedded binary data corresponding to mark up annotations superimposed on the image. The user may make the marked up image publically available on the Internet. The software may also include executable code that transmits the marked up image to a recipient. The software may also include executable code that provides at least one question for the recipient prior to transmitting the marked up image to the recipient, wherein the question is part of a composite mobile message that includes the marked up image. The question may be selected by the user from a list of possible questions provided by the markup software. The recipient may further annotate the marked up image to provide a further annotated marked up image. The recipient may provide the further annotated marked up image back to the user. The software may also include executable code that transfers the marked up image from the mobile device to a wearable augmented reality device that was used to capture the image prior to the image being provided to the mobile device. The recipient may make the further annotated marked up image publically available on the Internet.

The proposed system transmits photos or videos of scenes, instantly captured by a user wearing smart glasses with a camera, to a smartphone or tablet of the user that is running image markup software. A transmission may utilize direct wireless connection, submission to and synchronization with a cloud service and other mechanisms. The user marks up and annotates images or videos on the mobile device with markup capabilities (smartphone or tablet) and saves modified content on the device and/or in a cloud service, which allows subsequent recall and viewing of markups on the a smart glasses display of the user, sharing markups with others for further annotations, and displaying reply markups on the smart glasses display of the user.

There may be a variety of reasons for a user to highlight a portion of a live scene or the whole scene seen through smart glasses. The scene may be a spectacular view, there may be an unknown or unexpected object in the scene, the user may be challenged with finding a destination, manipulating objects or performing an activity, etc. Analogously, the purposes of marking up the scenes, and the corresponding flows of information may also be diversified. A user may mark an unusual object in a live scene, such as a great blue heron descending over a nearby tree or may add a friend's name to a photograph of a sunset on Maui for personal memories. Alternatively, a user may point an arrow to a skyscraper in a city skyline to ask a correspondent the name or details on the building. In a similar scenario, a user may ask a co-worker a name of a new employee captured on a photo. Another scenario may occur when a user is driving to visit a friend and apparently found a destination high-rise but is not sure which block and level is the right one. So, the visitor may stop a car in a safe location nearby, take an instant photo of the high-rise, mark up a couple blocks that the visitor thinks are candidates for the destination, and send the markup to the friend via email or mobile chat application to ask for details.

Different markup scenarios lead to a series of workflows where images and markups are transmitted, stored, synchronized, recalled and displayed on various devices. A first step in each workflow is the transmission of a captured scene, either in an image format or as a video file or stream, to a smartphone of the user where a markup application is running. Depending on connectivity options for smart glasses and a smartphone, a connection may be a direct data transmission between the smart glasses and the smartphone, for example, a Bluetooth connection, or an indirect data transmission, such as in a case of the smart glasses storing image data in a cloud service, such as Evernote or Dropbox, via Internet connection and the smartphone subsequently downloading data from the cloud service, for example, through the Evernote synchronization process using WAN (Wide Area Network) Internet connectivity, which includes cellular connectivity of the smartphone.

After a still image or a video image is delivered to a smartphone of a user, the image is opened in a markup application that may have various features for rich markup, such as arrows, freehand and assisted drawing, shapes and shape connectors, text, captions, semi-transparent highlighters, filling, line width and color options, shape alignment and cropping tools, etc. Examples of markup applications available on smartphones and tablets for a variety of mobile operating systems, such as iOS, Android and Windows Phone, include Skitch, PhotoPen, A+ Signature, iDoodle2 and many more. An existing metaphor of image markup application displays markup results in a still image or a video image format with embedded binary data reflecting markup components and enabling future editing of those components, such as deletion, modification and addition of markup components. Modification of markup components may include traditional editing operations, such as cut/copy/paste, move, resize, change component attributes (line width, type, color, effects), convert freehand lines to perfect shapes (shape recognition), etc. Additional display options for markup, such as different types of line animation, may also be offered in markup software.

After the user has finished markup of a still image or a video image, the results, possibly side-by-side with the original data, may be stored locally directly in the markup application data set and/or may be added to cloud storage of file or content management systems, such as Evernote, Dropbox, Box.net, Google Drive, Amazon AWS, etc. Additional options may include:

Mapping. In situations where location information is important, the system may retrieve user location using location-aware technologies (such as GPS) present in smart glasses and/or a smartphone and add mapping information to the markup; such information may also include an additional image showing a fragment of a map with a user location at the moment of capturing an image or starting recording of a video; furthermore, the a captured image, and a map image may be connected by an arrow, view sector or other connector automatically created by the system and indicating view angle at a location used to capture a real life scene.

Sharing and commenting. A user interface of markup software may include a feature of instant sharing of a markup of a still image or a video image via email, mobile messaging, online publishing, social networks, etc. Such sharing may include user comments that are added to a message and may be typed on a smartphone or a tablet or may be selected from a dedicated menu of standard comments and questions that may be displayed on a device screen once the user has chosen a sharing option. The standard comments and questions may include phrases such as: "What is it?", "Who is it?", "Which one?", "This is great!", "Never saw it before", etc.

The markup may be shared with select target recipients, for example, via email or mobile messaging, with a group of previously designated recipients, for example, via Facebook sharing, or with the public as in case of generic Web publishing, unrestricted Twitter, Flickr or Pinterest sharing. Correspondingly, if comments or other attributes of the shared markup solicit a response, recipients may respond using text messaging or, in case recipient(s) have the same or compatible markup application, the recipient(s) may modify the markup to respond.

Users may view responses or recall previously stored markups directly on displays of smart glasses. An ability to view responses or recall previously stored markups may be integrated with search in a content management system used to store markups when the user scans on the display some or all markups satisfying a search query; an ability to view responses or recall previously stored markups may also be combined with email and mobile messaging systems where messages arrive in response to user inquiries, with notification mechanisms of social networking systems (for example, when someone posts a response to markup on Facebook or tweets, the user may pull the response or a social network may push the response directly for viewing on smart glasses), etc.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for marking up instantly captured images and videos on smart glass using a smartphone of the user, and for storing, transmitting, modifying and displaying markups in a variety of storage, connectivity, editing and communications scenarios.

Figure 1:
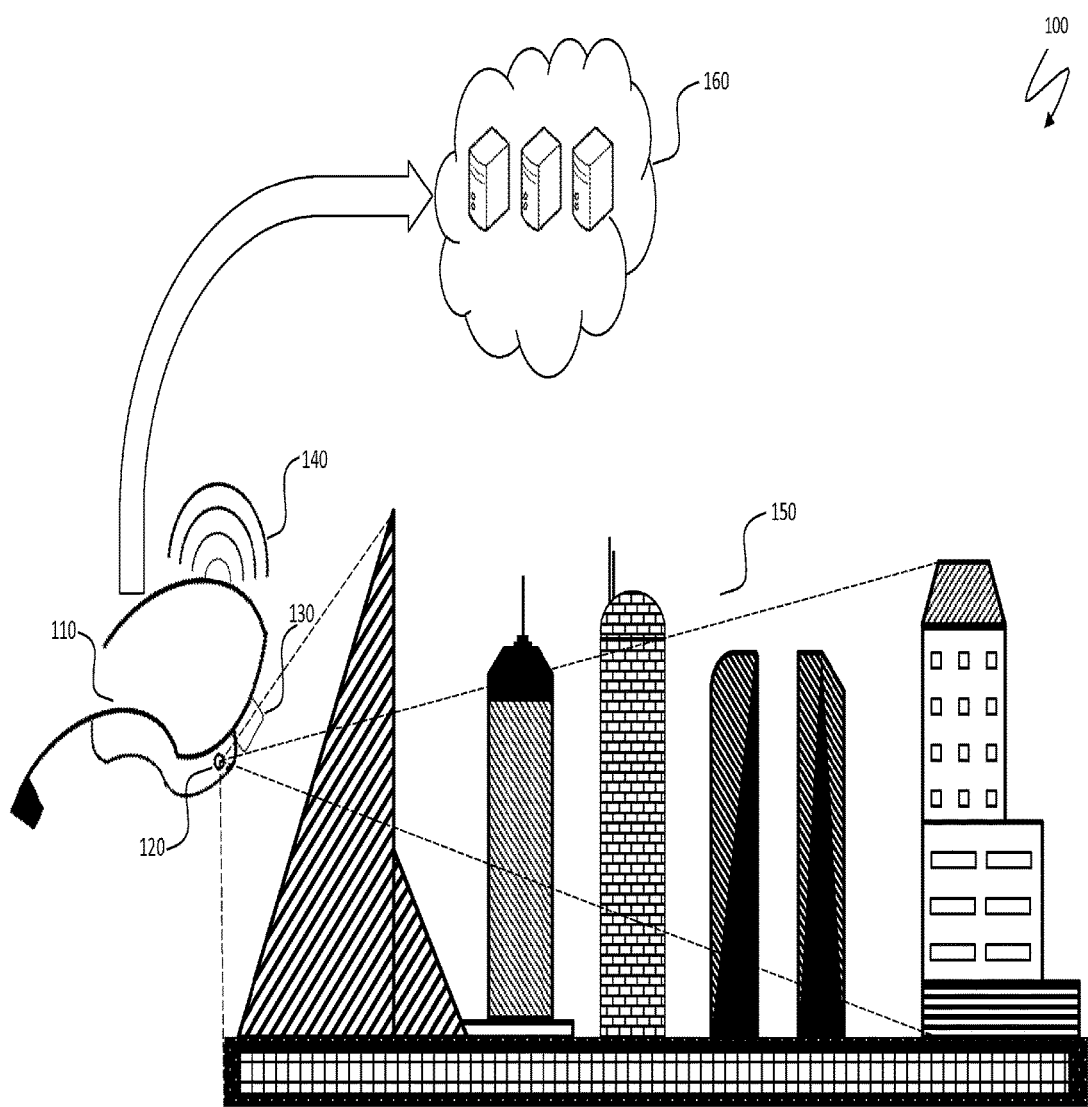
FIG. 1 is a schematic illustration of capturing a scene using smart glasses camera and storing an image in the cloud, according to embodiments of the system described herein.

FIG. 1 is a schematic illustration 100 of capturing a scene 150 using a a photo or video camera 120 of a smart glasses unit 110 and storing a resulting still image or video image in the cloud. The smart glasses unit 110 has an integrated display 130 and an internet connectivity device 140. The scene 150 represents a portion of a city skyline that is captured by the camera 120 (distance and viewing angles shown by dashed lines are presented schematically and purely for the illustration purpose). The Internet connection device 140 transmits the resulting image or video of the scene 150 to a content management system 160, such as the Evernote service provided by Evernote Corporation of Redwood City, Calif., that stores data in the cloud. As explained in more detail elsewhere herein, in some embodiments, the content management system 160 may be supplemented to provide functionality for messaging services that facilitate messaging between different users.

Figure 2A:
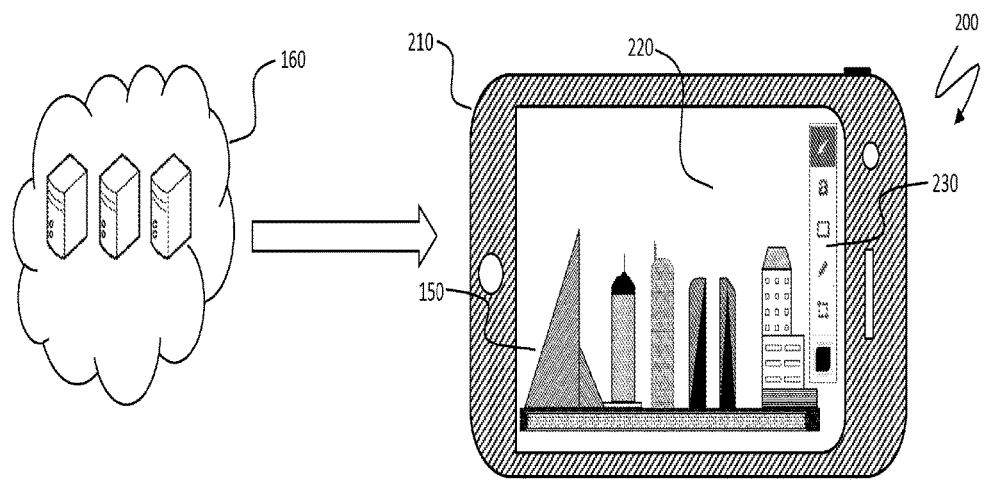
FIGS. 2A and 2B schematically illustrate a markup process and creation of a corresponding new item in a content management system, according to embodiments of the system described herein.

FIG. 2A is a schematic illustration 200 of a markup process and creation of a corresponding new item in a content management system. The content management system 160 stores an original still image or video image of a scene captured with smart glasses camera and transmits the image to a smartphone 210. The smartphone 210 runs a markup software application 220; an application toolbar 230 and the scene 150 are shown on a screen of the smartphone 210.

Figure 2B:
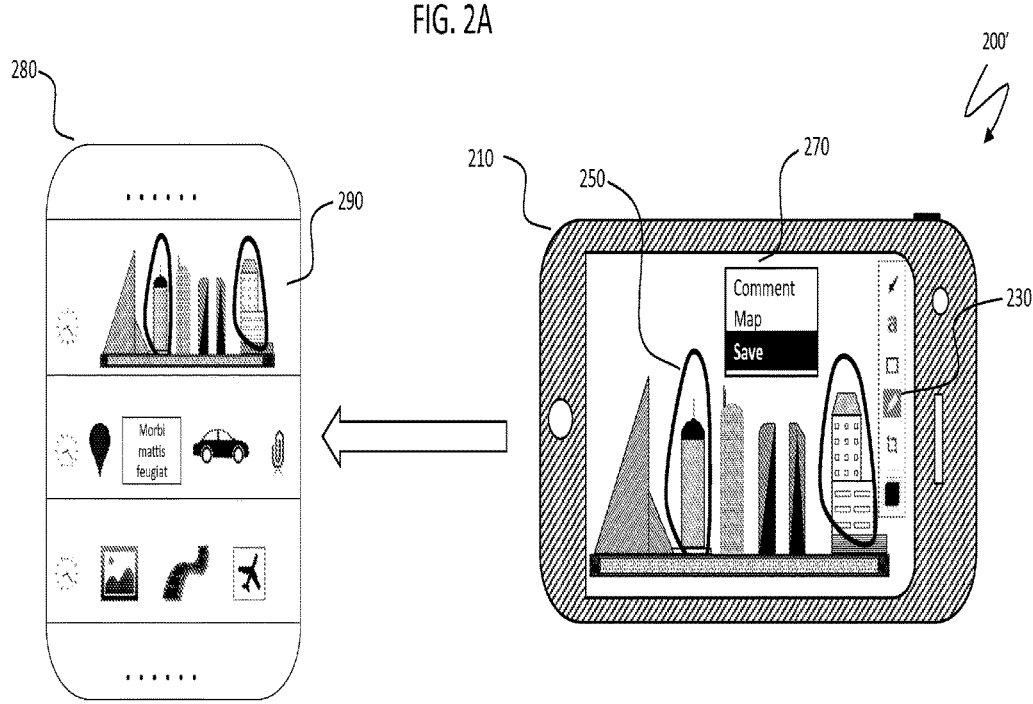

FIG. 2B is a schematic illustration 200' of a result of the markup process. The smartphone 210 shows activation of a drawing tool on the toolbar 230 and a markup 250 of the image. After a markup session is completed, the user is presented with several action items shown in a menu 270 and explained in more detail elsewhere herein. In FIG. 2B, the user chooses a save option, as shown by an inverted selection in the menu 270. Choosing the save option causes automatic creation of a new item in a cloud based content collection 280 that corresponds to the content management system 160 used to deliver the image to the smartphone 210. A new item 290 stores the markup with editable markup components; a time stamp is also shown in the item 290 and in other items of the content management system. After creation of the new item 290, the content collection 280 may be stored locally and synchronized with the central cloud-based copy of the content collection 280 in the content management system 160.

Figure 3:
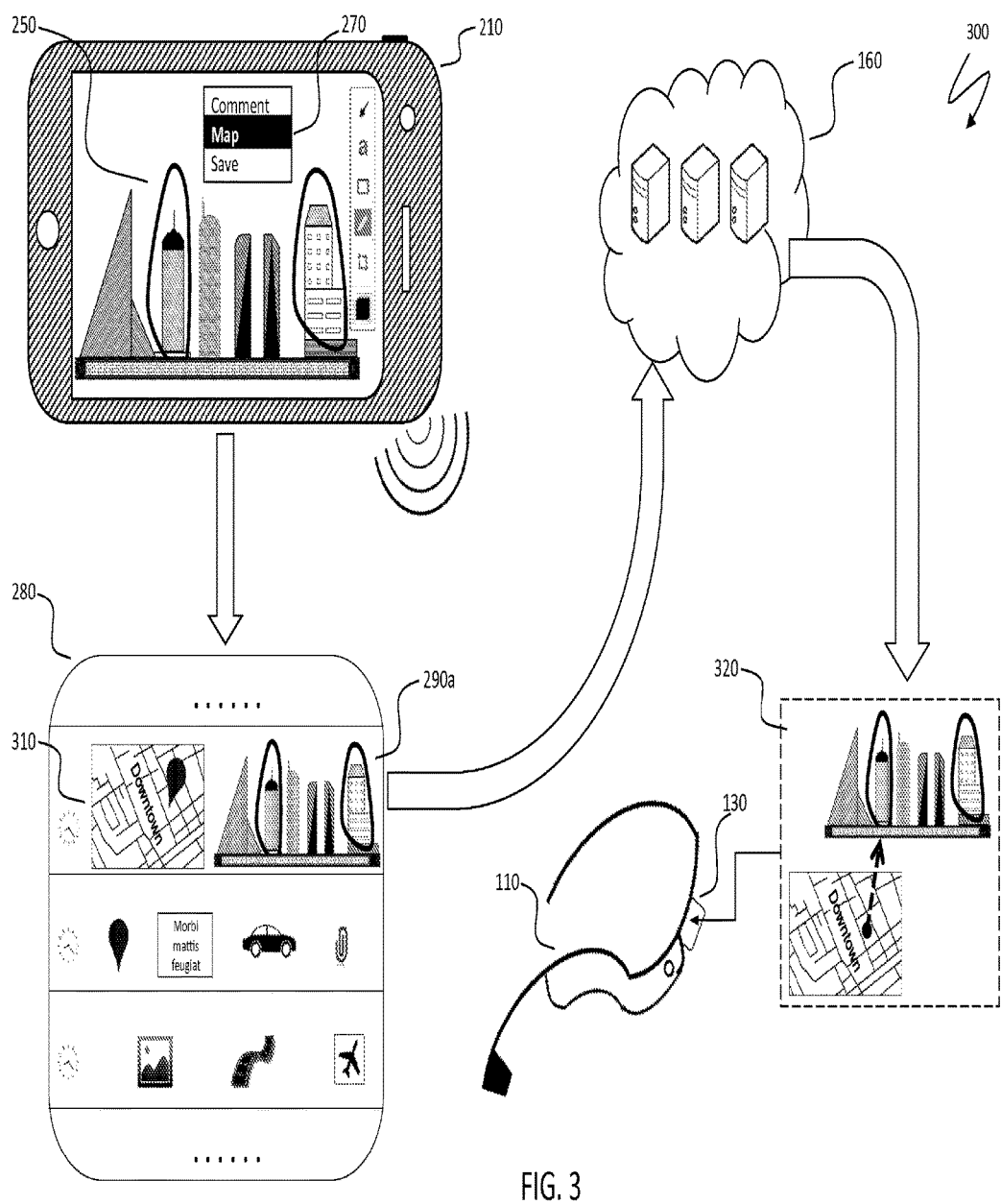
FIG. 3 is a schematic illustration of a mapping option in a markup workflow, according to embodiments of the system described herein.

FIG. 3 is a schematic illustration 300 of a mapping option in a markup workflow. The smartphone 210 with the markup 250 of a scene shows a choice of a mapping option by the user in the menu 270. The choice causes the system to determine a current location of the user utilizing location-awareness of smart glasses or a smartphone, to indicate the location on a fragment 310 of a map, and to store the image of the fragment 310 in the content collection 280, side-by-side with the markup 250, in a modified item (note) 290a. The content collection 280 is synchronized with a corresponding central cloud-based copy in the content management system 160, as explained elsewhere herein. Subsequently, the user may retrieve the item 290a by searching the content collection 280 or other appropriate mechanisms. In one scenario, the system may track user location and offer markups for automatic recollection of highlighted objects every time a user comes close to a location associated with a certain markup. The user may then view, on a display of the smart glasses, a combined image 320 of the fragment 310 and the markup 250. In the illustration of FIG. 3, an additional direction for a camera view is displayed on the map fragment 310.

Figure 4A:
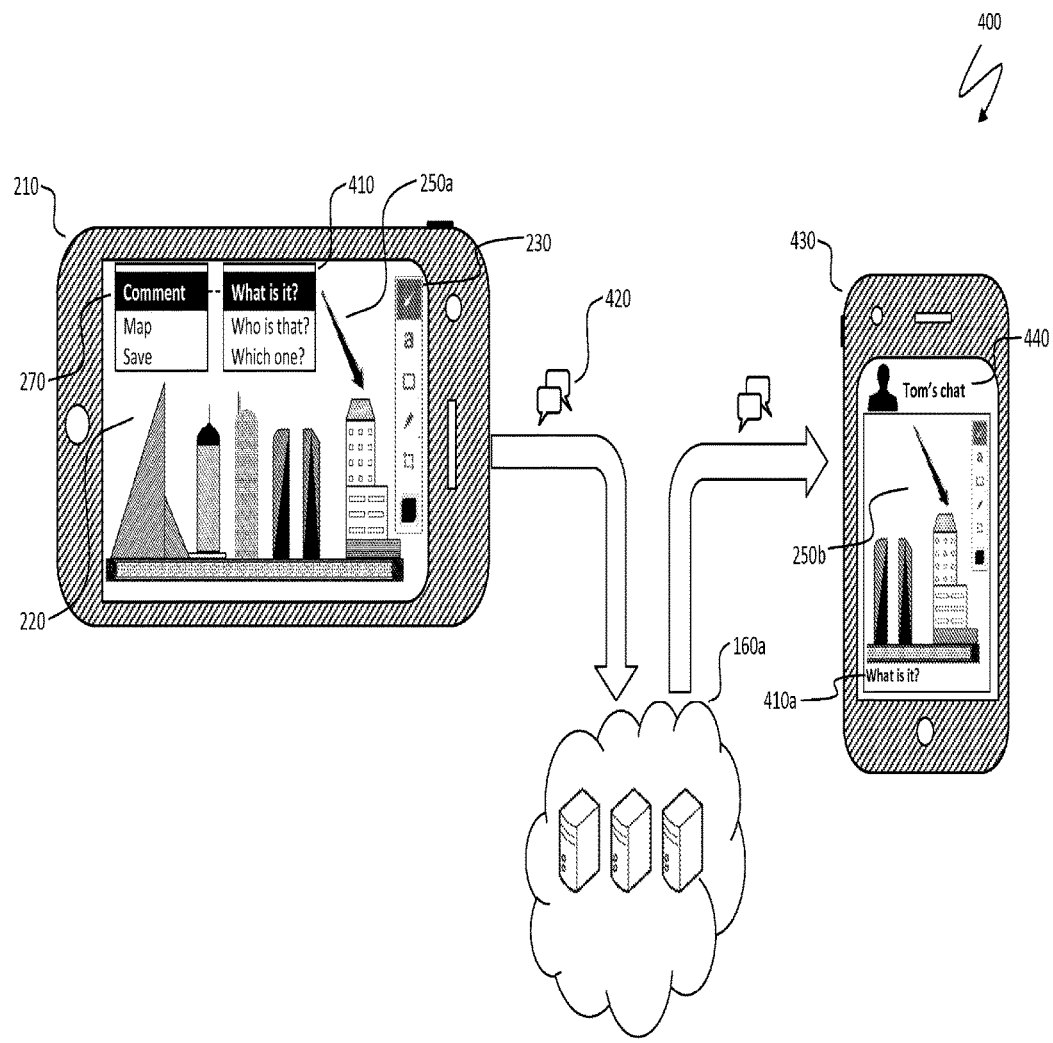
FIGS. 4A and 4B are schematic illustrations of a mobile communications workflow with markup modifications by mobile chat responders, according to embodiments of the system described herein.

FIG. 4A is a schematic illustration 400 of an initial mobile communications workflow with markup modifications by mobile chat responders. The smartphone 210 is running the markup software application 220. An arrow tool is selected on the application toolbar 230 and an arrow is drawn on an image markup 250a pointing to a particular object—a building in a city skyline in the example of FIG. 4A. The user has been presented with the action menu 270 and has chosen a commenting item, which is associated with sharing the markup with others. In response to a choice by the user, the system offers the user a list 410 of standard, most common questions and comments. In the example of FIG. 4A, the user is interested in identifying the building, which is reflected by the chosen question "What is it?"

Depending on a system configuration or on explicit user instructions, sharing may be done via an email, a mobile message, publishing on a web page, a social network and/or any other appropriate mechanism, as explained elsewhere herein. In FIG. 4A, mobile messaging is chosen, as indicated by a chat icon 420. The image markup 250a is transferred to a messaging server 160a, which may be integrated or otherwise combined with a content management system (not shown in FIG. 4A) to store the image markup 250a, as explained elsewhere herein. It should be noted that, prior to sending the image markup 250a to recipients, the user may crop the image markup 250a to contain only a relevant portion 250b, which is transmitted by the messaging server, to a mobile device 430 of a recipient running a mobile messaging application 440. In FIG. 4A, the mobile messaging application 440 integrates with a markup application on the mobile device 430, which enables a recipient (Tom) to provide a response by modifying the cropped image markup 250b, rather than just responding to a text message 410a, which reflects the comment chosen from the list 410, transmitted by the messaging server 160a and appended to the cropped image markup 250b.

Figure 4B:
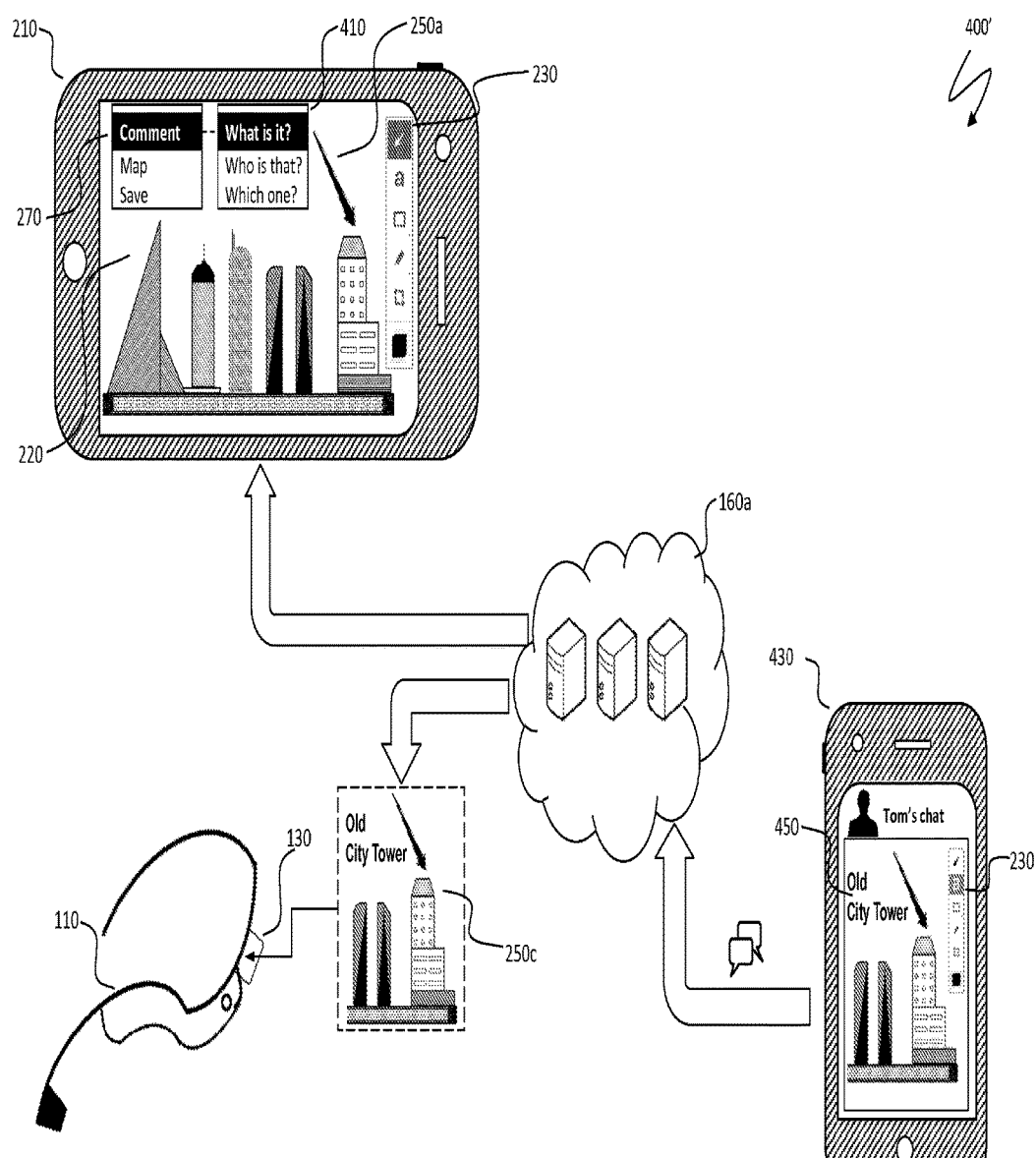

FIG. 4B is a schematic illustration 400' of a subsequent mobile communications workflow following the initial mobile communications workflow of FIG. 4A. The recipient provides a response 450 to the question 410a of the user, as shown on the smartphone 430. The recipient uses a text tool from the toolbar 230 and adds the response 450 directly to the markup image to identify the building as an "Old City Tower". A new mobile message with a modified markup image 250c is transmitted back to the messaging server 160a and may also be stored in a content management system (not shown in FIG. 4B), as explained elsewhere herein. The system transmits the modified markup image 250c to the user and presents the image 250c on the display 130 of smart glasses 110. Optionally, the system may synchronize the modified markup image 250c stored in the cloud-based content management system with the smartphone 210 of the user, which saves the modified markup image 250c in local storage of the smartphone 210.

Figure 5:
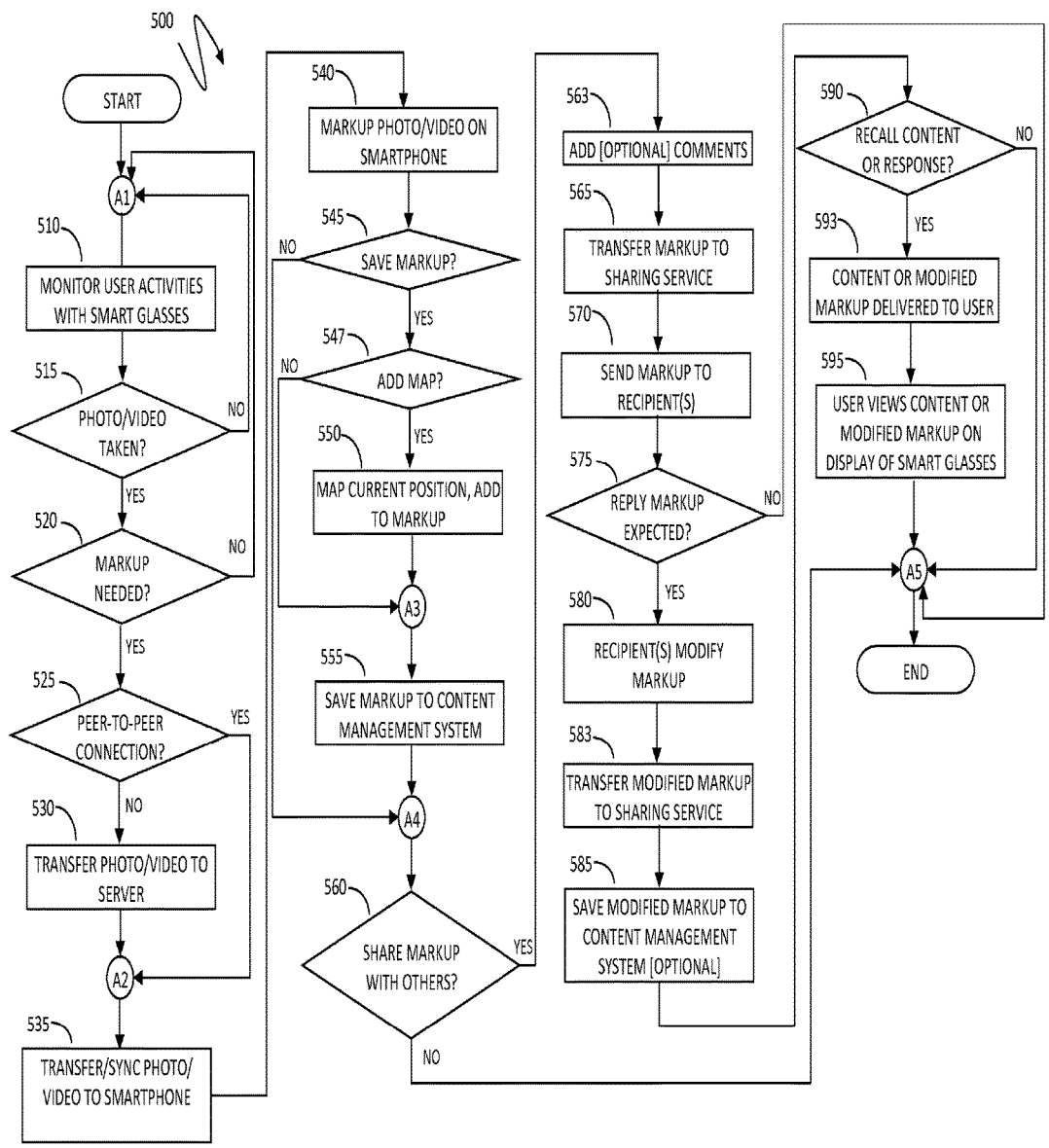
FIG. 5 is a system flow diagram illustrating operation of a system for providing markup modifications and responses, according to embodiments of the system described herein.

Referring to FIG. 5, a flow diagram 500 illustrates functioning of the system for providing markup modifications and responses described herein. Processing starts at a step 510 where the system monitors user activities with smart glasses. After the step 510, processing proceeds to a test step 515, where it is determined whether a photo or a video has been taken. If not, then processing proceeds back to the step 510; otherwise, processing proceeds to a test step 520, where it is determined whether the user needs to markup a captured still image or video image. If not, then processing proceeds back to the step 510; otherwise, processing proceeds to a test step 525, where it is determined whether smart glasses and/or a smartphone (or tablet) of the user have a peer-to-peer connection for direct data transmission. If not, then processing proceeds to a step 530 where the system transfers the captured photo or video to a server where a cloud-based file or content management system is running, as explained elsewhere herein. After the step 530, processing proceeds to a step 535 where the captured still image or video image (collectively, "image") is transferred to or synchronized with the smartphone (or tablet) of the user. The step 535 may also be directly reached from the test step 525 if there is a peer-to-peer connection between the smart glasses and the smartphone; in which case, the captured image may be transmitted directly to the smartphone, thus foregoing a cloud-based copy. It should be noted, however, that even in the case of peer-to-peer connection, a cloud-based copy may be created for future processing, retrieval and synchronization.

After the step 535, processing proceeds to a step 540 where the user marks up the transmitted image on the smartphone, as explained elsewhere herein. After marking up the image, the user is presented with an action menu and may choose different ways of utilizing markup functionality. After the step 540, processing proceeds to a test step 545 where it is determined whether the user has chosen to save the marked up image. If so, then processing proceeds to a test step 547 where it is determined whether the user has chosen to add a map to a saved marked up image, as explained elsewhere herein. If so, processing proceeds to a step 550 where the system identifies a current user position using location aware devices in the smart glasses or the smartphone and pins or otherwise annotates a user position on a map and adds to the marked up image, as a separate image, an image of a portion of the map with the annotated user position. After the step 550, processing proceeds to a step 555 where the markup (possibly with the addition of a map) is saved to the content management system, as explained elsewhere herein. The step 555 may also be reached directly from the test step 547 if there is no need to add a map to the markup.

After the step 555, processing proceeds to a test step 560 where it is determined whether the user wishes to share the marked up image with others (the step 560 may also be independently reached from the test step 545 if it is determined that there is no need to instantly save the marked up image in the content management system). If the user wishes to share the marked up image with others, then processing proceeds to a step 563 where the user may optionally add comments to the marked up image, for example, by choosing comments from a standard list, as explained elsewhere herein. After the step 563, processing proceeds to a step 565 where the marked up image (possibly with additional comments) is transferred to a sharing service, which may be running on mail, mobile messaging, social networking or web servers, as explained elsewhere herein. After the step 565, processing proceeds to a step 570 where the marked up image is sent to intended recipients who may be specific individual(s), a pre-defined group, the general public, etc.

After the step 570, processing proceeds to a test step 575 where it is determined whether a reply to the marked up image of the user is expected. If not, then processing is complete; otherwise, processing proceeds to a step 580 where recipient(s) modify the marked up image in response to a request by the user, as explained elsewhere herein. After the step 580, processing proceeds to a step 583 where the recipient(s) transfer the modified marked up image back to the sharing service. After the step 583, processing proceeds to a step 585 where the modified content is also saved to the content management system. As discussed elsewhere herein, in some embodiments, the step 585 may be optional. After the step 585, processing proceeds to a test step 590 where it is determined whether the user recalls previously stored marked up content or modified content sent by the recipients in response to user inquiries. If not, then processing is complete; otherwise, processing proceeds to a step 593 where a requested content or a modified marked up image entered by others is delivered to the user, as explained elsewhere herein. After the step 593, processing proceeds to a step 595 where the delivered content is presented on a display of smart glasses for viewing by the user. After the step 595, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

The mobile device may be a smartphone, although other devices, such as tablets or wearable computers, are also possible. The system described herein may be implemented with any type of electronic screen capable of being actuated by a touch screen, electromagnetic or other pen for multi-touch gestures, manipulation and drawings.

Note that the mobile device(s) may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a flash memory, a flash drive, an SD card and/or other drive, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for marking up an image, the method comprising, at a system that includes:
   a wearable device that includes a camera and a first display, and
   an electronic device that is communicatively coupled to the wearable device, wherein the electronic device includes an input device and a second display:
      capturing, by the camera, an image;
      determining, by a position detection sensor, a capture location for the captured image;
      displaying, by the second display:
         the captured image, and
         an indication, relative to a map, of the capture location;
      detecting, by the input device, first markup data that corresponds to the displayed image;
      storing:
         the first markup data,
         the capture location, and
         the indication, relative to the map, of the capture location;
      after storing the first markup data, the capture location, and the indication, relative to the map, of the capture location:
         determining, by the system, that a current location of the wearable device corresponds to the capture location; and
         in response to determining that the current location of the wearable device corresponds to the capture location, displaying, by the first display:
            the first markup data, and
            the indication, relative to the map, of the capture location.

2. The method of claim 1, wherein the wearable device is an augmented reality device.

3. The method of claim 1, wherein the position detection sensor is included in the wearable device.

4. The method of claim 1, wherein the position detection sensor is included in the electronic device.

5. The method of claim 1, wherein:
detecting the first markup data includes receiving, via the input device, markup input; and
the method includes displaying the markup input superimposed over at least a portion of the captured image.

6. The method of claim 1, wherein detecting the first markup data includes:
displaying, via the first display, a control for including automatically generated comment content in the first markup data;
detecting, via the input device, an input at a location that corresponds to the displayed control for including automatically generated comment content in the first markup data;
in response to detecting the input at the location that corresponds to the displayed control for including automatically generated comment content in the first markup data, displaying, via the first display, a plurality of automatically generated comment content items;
detecting a selection of an automatically generated comment content item from the plurality of automatically generated comment content items; and
in response to detecting the selection of the automatically generated comment content item from the plurality of automatically generated comment content items, including, in the first markup data, the selected automatically generated comment content item.

7. The method of claim 1, including:
transmitting, to a remote device, the captured image;
receiving, from the remote device, second markup data; and
in response to determining that the current location of the wearable device corresponds to the capture location, displaying the second markup data concurrently with displaying the first markup data.

8. A non-transitory computer readable storage medium storing one or more programs, the one or more programs comprising instructions, which, when executed by one or more devices of a system that includes a wearable device and an electronic device that is communicatively coupled to the wearable device, cause the system to:
capture, by a camera of the wearable device, an image;
determine, by a position detection sensor, a capture location for the captured image;
display, by a display of the electronic device:
the captured image, and
an indication, relative to a map, of the capture location;
detect, by an input device of the electronic device, first markup data that corresponds to the displayed image;
store:
the first markup data,
the capture location, and
the indication, relative to the map, of the capture location;
after storing the first markup data, the capture location, and the indication, relative to the map, of the capture location:
determine, by the system, that a current location of the wearable device corresponds to the capture location; and
in response to determining that the current location of the wearable device corresponds to the capture location, display, by a display of the wearable device:
the first markup data, and
the indication, relative to the map, of the capture location.

9. The non-transitory computer readable storage medium of claim 8, wherein:
detecting the first markup data includes receiving, via the input device of the electronic device, markup input; and
the one or more programs include instructions that cause the system to display the markup input superimposed over at least a portion of the captured image.

10. The non-transitory computer readable storage medium of claim 8, wherein detecting the first markup data includes:
displaying, via the display of the electronic device, a control for including automatically generated comment content in the first markup data;
detecting, via the input device of the electronic device, an input at a location that corresponds to the displayed control for including automatically generated comment content in the first markup data;
in response to detecting the input at the location that corresponds to the displayed control for including automatically generated comment content in the first markup data, displaying, via the display of the electronic device, a plurality of automatically generated comment content items;
detecting a selection of an automatically generated comment content item from the plurality of automatically generated comment content items; and
in response to detecting the selection of the automatically generated comment content item from the plurality of automatically generated comment content items, including, in the first markup data, the selected automatically generated comment content item.

11. The non-transitory computer readable storage medium of claim 8, wherein the one or more programs include instructions that cause the system to:
transmit, to a remote device, the captured image;
receive, from the remote device, second markup data; and
in response to determining that the current location of the wearable device corresponds to the capture location, display the second markup data concurrently with displaying the first markup data.

12. A system, comprising:
a wearable device; and
an electronic device that is communicatively coupled to the wearable device, wherein
the electronic device includes:
memory;
one or more processors; and
one or more programs, wherein the one or more programs are stored in the memory and configured to be executed by the one or more processors, the one or more programs including instructions for:
capturing, by a camera of the wearable device, an image;
determining, by a position detection sensor, a capture location for the captured image;
displaying, by a display of the electronic device:
the captured image, and
an indication, relative to a map, of the capture location;
detecting, by an input device of the electronic device, first markup data that corresponds to the displayed image;
storing:
the first markup data,
the capture location, and
the indication, relative to the map, of the capture location;

after storing the first markup data, the capture location, and the indication, relative to the map, of the capture location:
  determining, by the system, that a current location of the wearable device corresponds to the capture location; and
  in response to determining that the current location of the wearable device corresponds to the capture location, displaying, by a display of the wearable device:
    the first markup data, and
    the indication, relative to the map, of the capture location.

13. The system of claim 12, wherein the wearable device is an augmented reality device.

14. The system of claim 12, wherein the position detection sensor is included in the wearable device.

15. The system of claim 12, wherein the position detection sensor is included in the electronic device.

16. The system of claim 12, wherein detecting the first markup data includes receiving, via the input device of the electronic device, markup input; and
  the one or more programs include instructions for displaying the markup input superimposed over at least a portion of the captured image.

17. The system of claim 12, wherein the one or more programs include instructions for:
  transmitting, to a remote device, the captured image;
  receiving, from the remote device, second markup data; and
  in response to determining that the current location of the wearable device corresponds to the capture location, displaying the second markup data concurrently with displaying the first markup data.

* * * * *